(12) United States Patent
Côté et al.

(10) Patent No.: US 11,316,752 B2
(45) Date of Patent: Apr. 26, 2022

(54) ACTION RECOMMENDATION ENGINE (ARE) OF A CLOSED-LOOP MACHINE LEARNING (ML) SYSTEM FOR CONTROLLING A NETWORK

(71) Applicant: Ciena Corporation, Hanover, MD (US)

(72) Inventors: David Côté, Gatineau (CA); Thomas Triplet, Manotick (CA); Shelley Bhalla, Morrisville, NC (US); Emil Janulewicz, Ottawa (CA); Ayse Rumeysa Mohammed, Nepean (CA); Shady A. Mohammed, Nepean (CA); Shervin Shirmohammadi, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/892,594

(22) Filed: Jun. 4, 2020

(65) Prior Publication Data
US 2021/0385135 A1    Dec. 9, 2021

(51) Int. Cl.
*H04L 29/02* (2006.01)
*H04L 41/16* (2022.01)
*G06F 17/18* (2006.01)
*H04L 41/5009* (2022.01)
*H04L 41/0631* (2022.01)

(52) U.S. Cl.
CPC ............. *H04L 41/16* (2013.01); *G06F 17/18* (2013.01); *H04L 41/0645* (2013.01); *H04L 41/5009* (2013.01)

(58) Field of Classification Search
CPC ...................................................... H04L 41/16
See application file for complete search history.

(56) References Cited

U.S. PATENT DOCUMENTS

| | | | |
|---|---|---|---|
| 9,197,565 | B2 | 11/2015 | Khanchi et al. |
| 9,924,392 | B2 | 3/2018 | Côté et al. |
| 10,171,161 | B1 | 1/2019 | Côté et al. |
| 10,623,277 | B2 | 4/2020 | Djukic et al. |
| 2002/0188936 | A1 | 12/2002 | Bojanic et al. |
| 2014/0092204 | A1 | 4/2014 | Javadtalab et al. |
| 2018/0248771 | A1 | 8/2018 | Côté et al. |
| 2018/0248905 | A1* | 8/2018 | Cote ........................ G06F 17/18 |
| 2019/0138948 | A1 | 5/2019 | Janulewicz et al. |

(Continued)

*Primary Examiner* — Adnan M Mirza
(74) *Attorney, Agent, or Firm* — Clements Bernard Baratta; Lawrence A. Baratta, Jr.; Christopher L. Bernard (57) ABSTRACT

Systems and methods for recommending actions in a closed-loop system are provided. In one embodiment, an Action Recommendation Engine (ARE) may include a processor and memory configured to store computer programs having instructions that cause the processor to obtain input data pertaining to a state of a network and obtain information regarding one or more historical actions performed on the network. Also, the instructions may cause the processor to utilize a Machine Learning (ML) model for imposing one or more current actions on the network, the one or more current actions selected from the group of procedures consisting of: a) suggesting one or more remediation actions that, when performed, transition the network from a problematic state to a normal state, and b) identifying one or more root causes in response to detecting a transition in the network from a normal state to a problematic state.

20 Claims, 6 Drawing Sheets

(56) References Cited

U.S. PATENT DOCUMENTS

| | | |
|---|---|---|
| 2019/0207814 A1* | 7/2019 | Jain .................... H04L 41/0853 |
| 2019/0230046 A1 | 7/2019 | Djukic et al. |
| 2019/0280942 A1 | 9/2019 | Côté et al. |
| 2019/0303726 A1 | 10/2019 | Côté et al. |
| 2020/0082013 A1 | 3/2020 | Triplet et al. |

* cited by examiner

| RTT_avg | drop_frame | filters | index_down | index_play | label | latency | link | ratio | timestamp | action |
|---|---|---|---|---|---|---|---|---|---|---|
| 2 | 0.0 | [0 - 0] | 5.733333 | 4.533333 | Normal | 0.060000 | Router1-Router2 | 18.049333 | 03/24/2020 13:29:00 | No action taken |
| 2 | 0.0 | [0 - 0] | 6.437500 | 6.250000 | Normal | 0.078750 | Router1-Router2 | 0.968750 | 03/24/2020 13:29:35 | No action taken |
| 1 | 0.0 | [0 - 0] | 4.250000 | 4.375000 | Normal | 0.041875 | Router1-Router2 | 7.751250 | 03/24/2020 13:30:11 | No action taken |
| 2 | 0.0 | [0 - 0] | 6.411765 | 6.235294 | Normal | 0.074706 | Router1-Router2 | 2.794118 | 03/24/2020 13:30:46 | Apply filter |
| 3 | 0.0 | [27 - 3] | 2.000000 | 2.000000 | Router Issue | 0.426667 | Router1-Router2 | 1.041333 | 03/24/2020 13:31:22 | No action taken |
| 1388 | 0.0 | [27 - 3] | 1.000000 | 1.000000 | Router Issue | 0.554667 | Router1-Router2 | 1.666667 | 03/24/2020 13:31:57 | No action taken |
| 774 | 0.0 | [27 - 3] | 1.000000 | 1.000000 | Router Issue | 0.137333 | Router1-Router2 | 1.794000 | 03/24/2020 13:32:32 | No action taken |
| 442 | 0.0 | [27 - 3] | 1.000000 | 1.000000 | Router Issue | 0.150000 | Router1-Router2 | 1.738125 | 03/24/2020 13:33:04 | No action taken |

ACTION RECOMMENDATION ENGINE (ARE) OF A CLOSED-LOOP MACHINE LEARNING (ML) SYSTEM FOR CONTROLLING A NETWORK

TECHNICAL FIELD

The present disclosure generally relates to Machine Learning (ML) techniques. More particularly, the present disclosure relates to using ML to recommend and/or control the execution of one or more actions in an executable system or environment, such as a network.

BACKGROUND

Generally, Artificial Intelligence (AI) may include various algorithms or processes, such as Machine Learning (ML) processes, Reinforcement Learning (RL) processes, etc. For example, ML may be applied within a specific system or environment (e.g., a telecommunications network) to classify the "state" or status of the system. One who is an expert in the specific system may then use the state information or classification to determine what types of actions may be taken. Therefore, if the state information indicates that there are issues in the system, the expert can decide what actions may be taken to rectify the issues. The expert's decisions can be based on prior experience or a predetermined set of business rules that may apply to the specific system.

RL may include the process of learning behaviors based on state classification. However, one challenge of operating with RL is the training phase. During the training phase, the RL technique is typically configured to determine behaviors in order to optimize a "reward" function. The training phase for RL typically involves intensive computations and a significant amount of data before a RL-based agent may be deployed in the system.

Currently, networks may be controlled via various approaches including control planes, Software Defined Networking (SDN) controllers, Network Management Systems (NMSs), and the like. As described herein, networks can include Layer 0 (e.g., photonics, Dense Wavelength Division Multiplexed (DWDM), etc.), Layer 1 (e.g., Time Division Multiplexed (TDM), Optical Transport Network (OTN), etc.), Layer 2 (e.g., Packet, Multi-Protocol Label Switching (MPLS), etc.), Layer 3 (e.g., Internet Protocol (IP)), and the like, including combinations thereof. This conventional management plane approach relies heavily on operator input and control. There is a movement towards autonomous control, i.e., AI-based network control. However, there is no generally agreed-upon solution related to the concerns of AI safety, especially with closed-loop Reinforcement Learning (RL) systems. Some thoughts related to solutions include the design of the AI system itself to incorporate some safeguards to prevent negative actions, use of multiple AI systems that check their actions against one other (e.g., majority decision on a correct action to take), or testing of the AI system on a small scale domain until it has shown to not take negative actions over some lengthy testing time.

There are limitations of these current solutions as follows. First, the ability of the AI system design to avoid negative actions is dependent on how well the reward system encourages/discourages the selection of outcomes based on past outcomes. Second, each domain level AI system instance, albeit with the same trained model, could learn differently, resulting in chaos with respect to service/network/slice behaviors. Third, the reward function may become neutral (i.e., bypassed) or ineffective in influencing outcomes as the AI system learns to expand the set of possible actions and/or outcomes. Fourth, the use of multiple AI systems does not eliminate the potential for multiple systems to agree on negative actions or to separately learn inappropriate behaviors. Fifth, testing of an AI system on a small scale system does not avoid the potential that the behaviors of the AI system will either not work in the larger system or that the AI system will modify its behaviors as it learns and eventually incorporates negative behaviors. Therefore, there is a need in the field of AI to overcome the above-noted limitations. Also, there is a need to utilize a trained ML model in a specific system, such as a network, to execute one or more actions based on the state of the system, whereby the ML can be executed with less intensive computations and using less data than is normally involved when training RL models.

BRIEF SUMMARY

The present disclosure is directed to systems and methods for recommending and/or controlling actions on a system within a closed-loop or feedback loop architecture. According to one implementation, a device referred to herein as an Action Recommendation Engine (ARE) may comprise a processing device and a memory device. The memory device is configured to store a computer program having logic instructions configured to cause the processing device to obtain input data pertaining to a state of a network and obtain information regarding one or more historical actions performed on the network. In addition, the logic instructions of the computer program are further configured to cause the processing device to utilize a Machine Learning (ML) model for imposing one or more current actions on the network. The one or more current actions may be selected from the group of procedures consisting of: a) suggesting one or more remediation actions that, when performed, transition the network from a problematic state to a normal state, and b) identifying one or more root causes in response to detecting a transition in the network from a normal state to a problematic state.

According to another implementation, a non-transitory computer-readable medium configured to store computer logic is provided. The computer logic has instructions that, when executed, cause one or more processing devices to obtain input data pertaining to a state of a network and obtain information regarding one or more historical actions performed on the network. Furthermore, the instructions cause the one or more processing devices to utilize a ML model for imposing one or more current actions on the network, the one or more current actions selected from the group of procedures consisting of suggesting one or more remediation actions that, when performed, transition the network from a problematic state to a normal state, and identifying one or more root causes in response to detecting a transition in the network from a normal state to a problematic state.

According to yet another embodiment, a method may include the steps of obtaining input data pertaining to a state of a network, obtaining information regarding one or more historical actions performed on the network, and utilizing a Machine Learning (ML) model for imposing one or more current actions on the network. The one or more current actions may be selected from the group of procedures consisting of: a) suggesting one or more remediation actions that, when performed, transition the network from a problematic state to a normal state, and b) identifying one or more root causes in response to detecting a transition in the network from a normal state to a problematic state.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for training a Machine Learning (ML) model using historical data and utilizing the ML model in any system or environment, such as a network. The network may be a packet network, optical network, multi-layer network, Internet Protocol (IP) network, telecommunications network, or other suitable system having a network-type architecture. The ML model may be configured to operate in a "closed-loop" or feedback system for performing closed-loop automation. The utilization of the ML may include classifying the state of network elements in the network. To "close the loop," per se, a state-to-action mapping is determined by a domain expertise (e.g., determined by a network operator configured to maintain and control the network). Hence, the state classification can normally be learned, but not the remediation actions. However, according to the embodiments described in the present disclosure, ML models may include self-monitoring in a distributed software architecture, safeguarding automated closed loops, or other functions.

In some cases, Reinforcement Learning (RL) may be used to automate various behaviors or actions, based on the state of the system. In a networking environment, RL may be applied for Border Gate Protocol (BGP) traffic optimization, optimizing network utilization, and/or other uses. An AI system may be configured to focus on learning the remediation actions via RL.

However, in some cases, RL may have limitations. One of the challenges of RL is the training phase, during which the RL algorithm explores the action space to optimize a reward function. This training phase is typically computationally intensive and may require significant amounts of data before a RL-based agent may be deployed in a production network.

According to some embodiments, a Collaborative Filtering (CF) is a technique that may be used in the present systems and methods. Conventional online merchants and streaming platforms may occasionally use CF to recommend new products or movies based on the interest of other users with a similar profile. However, the CF technique is typically used in the realm of online shopping, movie recommendations (e.g., on a streaming service, etc.), but has not been applied to close-loop automation of networks as described in the present disclosure.

The present disclosure describes embodiments that may include a ML framework to identify actions performed on networks and then use information regarding these actions to feed a recommendation engine to determine further actions to take. In contrast to other feedback processing systems that learn based on "states," the embodiments of the present disclosure focus on systems that are configured to learn based on "actions." Also, instead of using Reinforcement Learning (RL)-type processing, the embodiments of the present disclosure focus on using 1) supervised ML, 2) Collaborative Filtering (CF), or 3) a combination of the two, which are fundamentally different from RL. In particular, significantly less data is required to train the supervised ML and CF algorithms compared to RL.

Furthermore, the present disclosure introduces a different type of device for providing recommendations. Instead of recommending products (e.g., via shopping sites), movies (e.g., via streaming sites), songs (e.g., via streaming music sites), etc., the present disclosure provides an engine for recommending "actions" within an environment being controlled in a closed-loop or feedback system. This new engine or algorithm may be referred to as an Action Recommendation Engine (ARE).

In some embodiments, the ARE may be configured to train internal ML models from historical data. The training may use either supervised ML or CF approaches. The ARE may then be embedded with trained ML models for operation within an environment (e.g., network) being monitored and controlled. The ML model of the ARE may be used to suggest remediation actions. Additionally, when problematic issues are discovered in the environment (e.g., problems with network elements within a network), the ARE may not only suggest remediation actions, but also suggest likely root-causes of the problematic issues.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Figure 1:
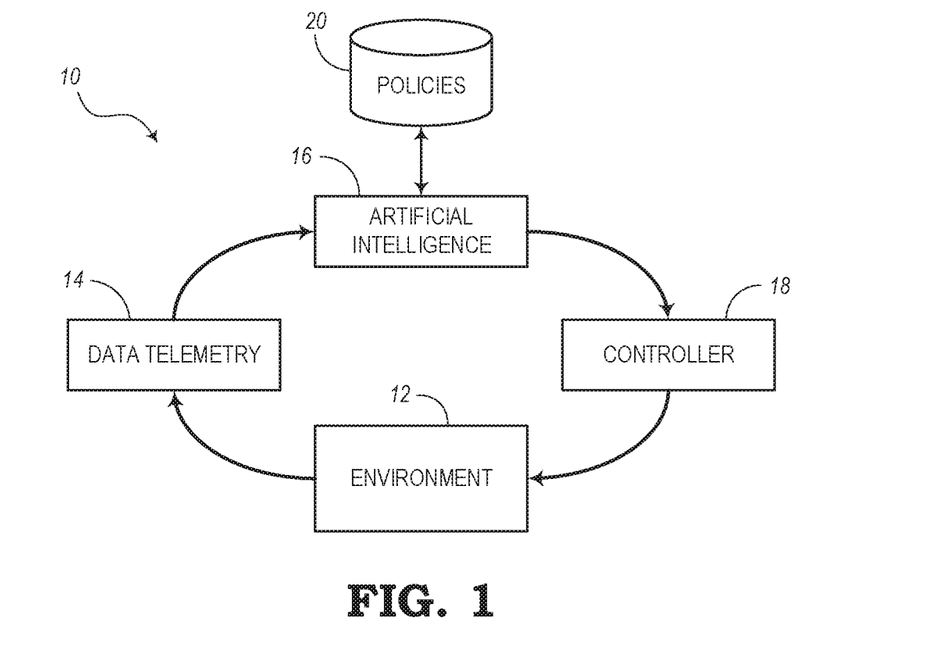
FIG. 1 is a block diagram illustrating of an AI-driven feedback loop for adaptive control of a system or environment, according to various embodiments of the present disclosure.

FIG. 1 is a block diagram of an AI-driven feedback loop 10 for adaptive control of an environment 12 (e.g., a network or other suitable type of executable system). The environment 12 may include multiple components or sub-systems (e.g., network elements), which can be physical and/or virtual components. The AI-driven feedback loop 10 may include an Artificial Intelligence (AI) system 16, which can receive data telemetry 14 from the environment 12. Based on predetermined policies 20, the AI system 16 can process the data telemetry 14 using data-driven training and inference models and then provide results to a controller 18 or orchestrator for control of the environment 12.

The controller 18 is configured to modify/update the components or sub-systems (e.g., network elements) of the environment 12 based on the feedback from the AI system 16. The AI system 16 can be a server, network controller, SDN application, cloud-based application, etc. The AI system 16 may include one or more processing device which receive inputs (e.g., data telemetry 14) and provides outputs to the controller 18 for automated control of the environment 12. The AI system 16 can also be referred to as an ML inference engine.

Various techniques for AI control, ML, etc., are contemplated. Some examples are described in commonly-assigned U.S. patent application Ser. No. 16/185,471, filed Nov. 9, 2018, and entitled "Reinforcement learning for autonomous telecommunications networks," U.S. Pat. No. 10,171,161, issued Jan. 1, 2019, and entitled "Machine learning for link parameter identification in an optical communications system," U.S. patent application Ser. No. 16/251,394, filed Jan. 18, 2019, and entitled "Autonomic resource partitions for adaptive networks," and U.S. patent application Ser. No. 15/896,380, filed Feb. 14, 2018, and entitled "Systems and methods to detect abnormal behavior in networks," the contents of each are incorporated by reference herein.

The AI-driven feedback loop 10 can play an instrumental role in adaptive network systems. Such systems need response time (i.e., time to compute the probability of an outcome given input data) to be fast for identifying an optimal action to take in order to change network/service state. This can be a complex decision that needs to consider input data patterns, network/service states, policies 20, etc.

Generally, two broad types of AI can be used to drive "closed loops" by the AI system 16, namely 1) supervised or unsupervised pattern-recognition algorithms used to understand what is happening in the environment 12 (e.g., see U.S. patent application Ser. No. 15/896,380 noted herein), and 2) reinforcement learning used to decide what actions should be taken on the environment 12 (see U.S. patent application Ser. No. 16/185,471 noted herein).

Figure 2:
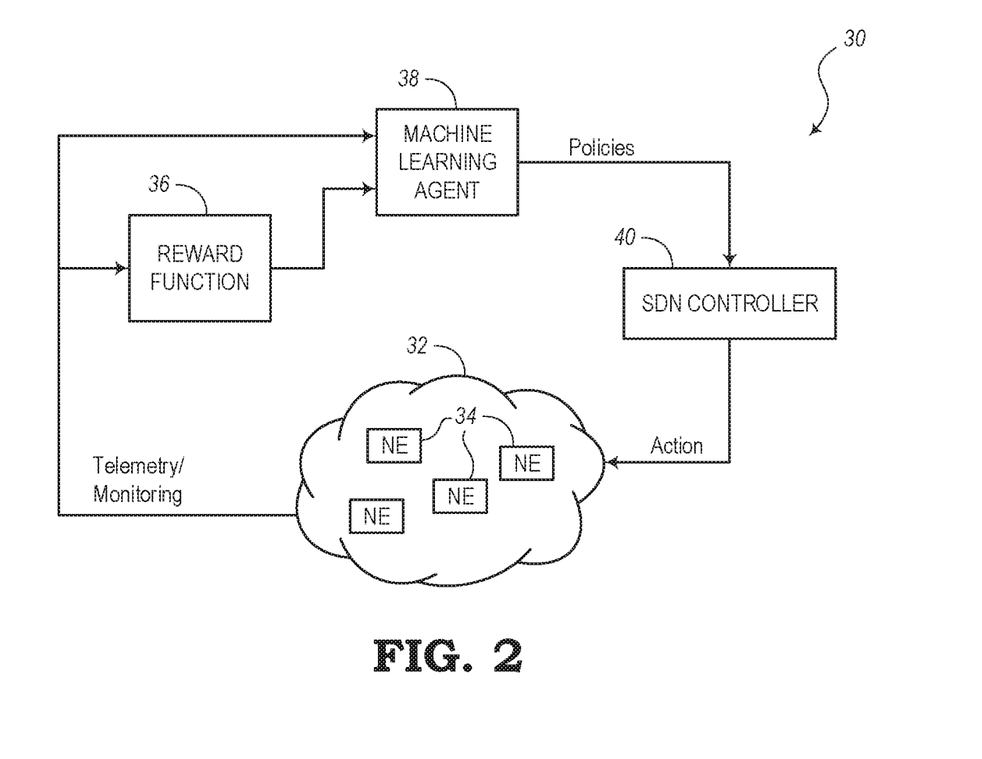
FIG. 2 is a block diagram illustrating a Reinforcement Learning (RL) system for controlling a network, according to various embodiments.

FIG. 2 is a block diagram of a Reinforcement Learning (RL) system 30. Reinforcement Learning can be used for closed-loop applications where there may not be a need for human supervision and the AI system 16 can independently derive state information from an executable system or other controllable environment, and then decide on actions to affect that environment, e.g., a service or resource instance in a given network domain. In FIG. 2, the RL system 30 is arranged to control an executable system or environment, which, in this implementation, is configured as a network 32 (e.g., a network).

In the network environment, the network 32 may include a number of Network Elements (NEs) 34 (or other components or sub-systems). The NEs 34 may include physical and/or virtual elements. The physical network elements can include switches, routers, cross-connects, add-drop multiplexers, and the like. The virtual network elements can include Virtual Network Functions (VNFs) which can include virtual implementations of the physical network elements. The network 32 can include one or more layers including optical (Layer 0), TDM (Layer 1), packet (Layer 2), etc. In one embodiment, the NEs 34 can be nodal devices that may consolidate the functionality of a multi-service provisioning platform (MSPP), digital cross-connect (DCS), Ethernet and Optical Transport Network (OTN) switch, DWDM platform, etc. into a single, high-capacity intelligent switching system providing Layer 0, 1, 2, and/or 3 consolidation. In another embodiment, the NEs 34 can be any of an Add/Drop Multiplexer (ADM), a multi-service provisioning platform (MSPP), a digital cross-connect (DCS), an optical cross-connect, an optical switch, a router, a switch, a Wavelength Division Multiplexing (WDM) terminal, an access/aggregation device, etc. That is, the NEs 34 can be any system with ingress and egress signals and switching of packets, channels, timeslots, tributary units, wavelengths, etc. The network 32 can be viewed as having a data plane where network traffic operates and a control plane (or management plane) where control of the data plane is performed. The control plane provides data telemetry 14 during operation. The data telemetry 14 can include, without limitation, Operations, Administration, Maintenance, and Provisioning (OAM&P) data, Performance Monitoring (PM) data, alarms, and the like.

The network 32 provides telemetry and monitoring data to a reward function 36 and to an ML agent 38. The reward function 36 also provides an input to the ML agent 38. The ML agent 38 can be configured as the AI system 16 shown in FIG. 1, according to some embodiments, and may provide an interpreter function observing the network 32 via the telemetry and monitoring data for current state information and determining the actions required to achieve a target state. The reward function 36 is used by the ML agent 38 to maximize the probability, and thus reinforcing behavior, of achieving the target state.

Typically, the RL system 30 is initially trained on a large data set in order to give it a base set of operational policies for business/service/network target states to invoke or maintain based on the state of the network 32, then an inference model of the RL system 30 may continue to learn and refine its behavior as it is exposed to the real-world behaviors and may observe the results of its actions there. In some cases, the RL system 30 may need to experiment with an available set of possible actions constrained by operational policies while attempting to find the optimal action. In some cases, the operational policies themselves could be refined, i.e., dynamic policy, based on observed current state as well as actions taken in previous attempts.

In some embodiments, the RL system 30 may be configured to define costs and rewards to quantify network actions, determine allowed network actions, and define metrics describing a state of the network 32. The RL system 30 may obtain network data to determine a current state of the network 32 based on the defined metrics and determine one or more of the network actions based on the current state and based on minimizing the costs and/or maximizing the rewards. That is, RL includes rewards/costs which set an objective or goal. A state may be defined according to where the network 32 is relative to the objective/goal and what network actions may be performed to drive the state towards the objective/goal.

Other types of Machine Learning (ML) can be used to drive closed-loop network applications, notably: pattern-recognition and event-classification techniques such as Artificial Neural Networks (ANN) and others. In this case, a set of raw inputs from the telemetry and monitoring data can be turned into a higher-level insight about the network state, which in turn can be used to decide how to take actions to modify the network 32. For example, collections of performance monitoring data can be interpreted by an AI as: "there seems to be a congestion happening on link X affecting services ABC," "bandwidth allocated to service D should become under-utilized for the next 8 hours and could be used elsewhere," "behavior of device Y suggests a high risk of failure within next 2-3 days," etc. As a result, network policies could take automated actions such as re-route low-priority away from link X, re-allocate some of the service D bandwidth to other services EFG or re-route services away from device Y and open a maintenance ticket.

Figure 3:
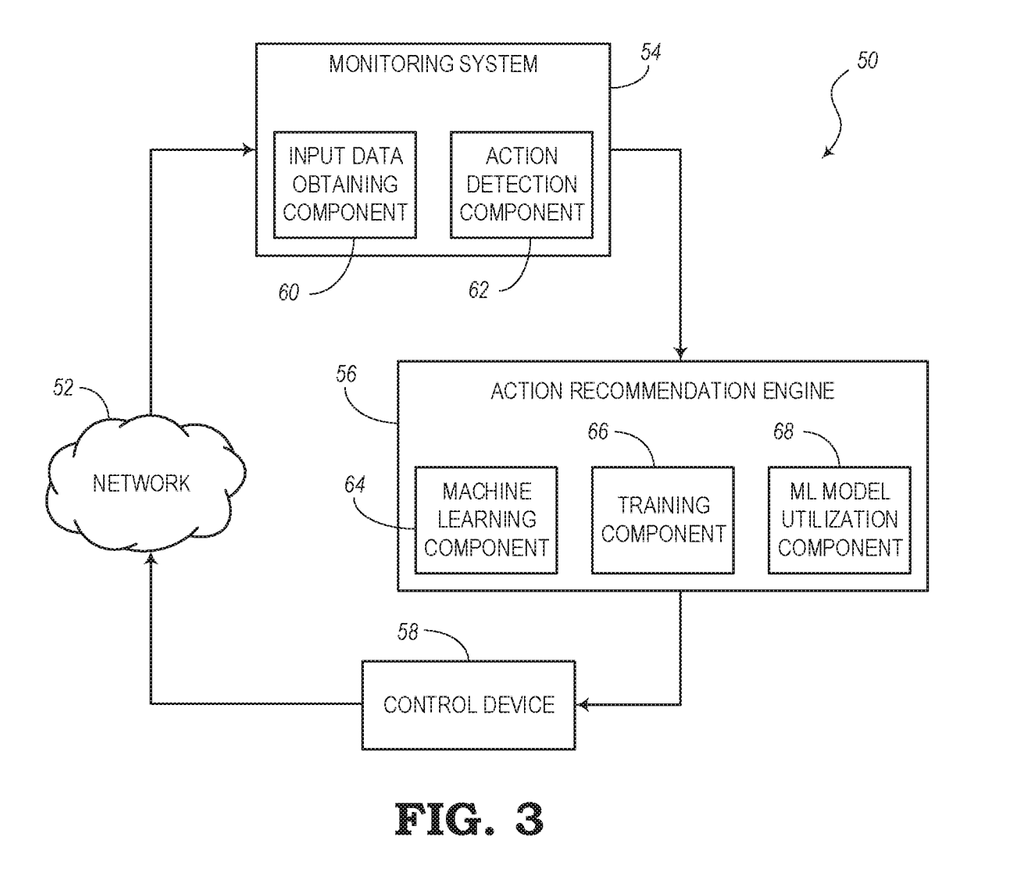
FIG. 3 is a block diagram illustrating a closed-loop system for providing adaptive control of a network, according to various embodiments.

FIG. 3 is a block diagram illustrating another embodiment of a closed-loop system 50 for providing adaptive control of a network 52. A monitoring system 54 may be used to obtain historical input data from the network 52. The input data may include metrics, parameters, characteristics, etc., measured or obtained in any suitable manner from network elements of the network 52. In addition to statistic-type data, the monitoring system 54 is also configured to obtain information about various actions that have taken place in the network 52. The data and information obtained by the monitoring system 54 is provided to an Action Recommendation Engine (ARE) 56, which includes AI-based processing to utilize the data/information for training a model. Once trained, the model of the ARE 56 may be utilized for providing control instructions to a control device 58. In this way, when newly obtained metric data and action information is provided to the ARE 56, the ARE 56 can utilize the AI model to instruct the control device 58 to perform certain functions. For example, the control device 58 may be configured to perform certain recommended actions on the network 52 or to simply provide a recommendation of actions that may be taken by a network operator responsible for enacting changes to the network 52.

More particularly, the monitoring system 54 shown in FIG. 3 includes an input data obtaining component 60, which is configured to obtain input data (e.g., telemetry data) regarding measurements of various parameters or metrics of the network 52. In addition, the monitoring system 54 includes an action detection component 62, which is configured to detect historical actions that have been applied to the network 52.

According to some embodiments, the ARE 56 may include a Machine Learning (ML) component 64, a training component 66, and a ML model utilization component 68. The ML component 64 is configured to perform various machine learning processes, as described in more detail below, and may also assist in controlling the training component 66 and ML model utilization component 68, as needed. The training component 66 is configured to train (and re-train, as needed) a ML model based on the historical data and actions imposed on the network 52. Once a ML model is trained, the ML model utilization component 68 is configured to use the trained ML model to process new parameters obtained from the network 52 and new actions imposed on the network 52 to perform remediation actions, instructional actions, and/or detection actions, as described with respect to FIG. 5.

The ARE 56 may be implemented with supervised ML. Equipped with input data from the monitoring system 54, the ARE 56 can be implemented as a (multi-class) classifier trained with a supervised ML approach. In this framework, the time-series of alarms and KPIs are the features characterizing the different possible states of network elements, while the actions are the labels that are to be learned. For example, labels may be "normal," "router issue," "congestion," "high traffic," etc.

The present disclosure therefore describes a closed-loop system 50 having an Action Recommendation Engine (ARE) 56 that is based on Machine Learning (ML) to support closed-loop applications for networks. Once input is received by the monitoring system 54, there may be two different approaches to implementing the ARE 56: 1) one approach based on supervised ML, and 2) one approach based on Collaborative Filtering. The ARE 56 can then be used to provide some results that can improve the state of the network 52 or provide various benefits for solving or improving network issues, such as, among others: 1) recommending a closed-loop action, and 2) identifying one or more root-causes of network issues.

Again, the monitoring system 54 is configured to receive input data. To be used "live" (inference), the inputs to the ARE 56 are the same as some network assurance applications. The inputs may include alarms, Key Performance Indicators (KPIs) of the network elements, traffic and services flow information, Quality of Service (QoS) information, Quality of Experience (QoE) information, etc. However, for the training component 66 of the ARE 56 to train ML models, the ARE 56 relies on an input that is not normally utilized. In particular, the new input that is uses is information regarding a plurality of actions performed on the network 52. For instance, some of the actions may include:

DOC Action: Channel Add in Progress, MRS-R00, Shelf:1 Slot:1, 2020-03-24 21:49:52

DOC Action: Channel Delete in Progress, MRS-R00, Shelf:1 Slot:1, 2020-03-24 22:53:22

Software Auto-Upgrade in Progress—MOTR, WAT-R002, Shelf:5 Slot:13, 2020-03-24 23:49:52

Protection Switch Complete—Revertive—OTM0 Shelf:1 Slot:5 Port:6, 2020-03-25 08:25:58

The events, network operations, or other information regarding network actions can be collected from sources such as Network Management Systems (NMSs), ticketing systems, Network Configuration and Change Management (NCCM) systems, etc. One goal may be to collect as much data as comprehensively as possible in order to derive the best precision and recall from ML algorithms.

Figure 4:
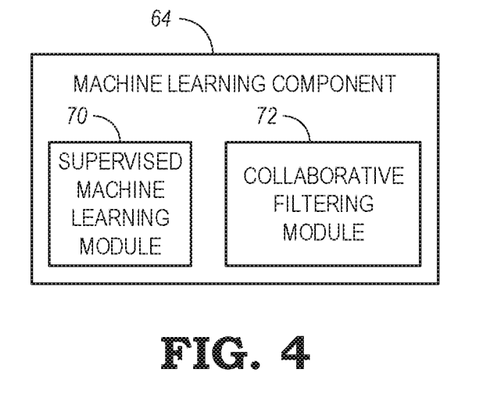
FIG. 4 is a block diagram illustrating the Machine Learning (ML) component shown in the Action Recommendation Engine (ARE) of the closed-loop system of FIG. 3, according to various embodiments.

FIG. 4 is a block diagram illustrating an embodiment of the Machine Learning (ML) component 64 shown in the ARE 56 of the closed-loop system 50 of FIG. 3. In this embodiment, the ML component 64 includes a supervised Machine Learning (ML) module 70 and a Collaborative Filtering (CF) module 72.

The ARE 56 may be implemented using a technique derived from CF, which may be performed by the CF module 72. CF processes or algorithms are typically used to make predictions about interests of a user by collecting preferences or choices from many collaborating users. For example, a conventional e-commerce merchant may use CF algorithms to recommend the most popular or most often purchased new products to prospective buyers.

In the CF framework of the present disclosure, network operators may correspond to users, while actions correspond to products. In some cases, users/network operators need not be humans and may correspond to an automated system (e.g., based on ML, RL, etc.). The CF module 72 may be configured with a sequential-context-aware variant of CF, where the current and historical states and/or actions of the network may correspond to the context.

The implementation of the CF module 72 in the ARE 56 may involve the following steps:
1) Given a problematic state $S^p\_i$ and a context ($(S^p\_j, A^{pn}\_j)$ for $j<i$), compare historical actions of a current user with other users and rank other users based of pattern similarity. Various methods may be used to evaluate the pattern similarity, including the Cosine distance or Pearson correlation.
2) Given that same context, score and rank possible remediation actions using the actions of similar users. Actions may be weighted based on the rank/similarity of the other users.
3) Recommend the action(s) $A^{pn}\_i$ with highest score to the user.

The CF approach of the CF module 72 may work well with sparse data and requires little domain knowledge. For this reason, it may be complementary to the ML-based approach for the delay module 82 described below with respect to FIG. 6.

The two approaches may be used separately or together to improve the accuracy and relevance of the recommended actions for close-loop scenarios. For instance, this approach would enable advanced generic ML models to be trained offline as per the supervised ML module 70, while enabling automatic tuning of recommendations from the ML algorithm to handle effectively the specificities of the NOC/customer where the system is deployed, as well as improving the relevance of the recommendations over time. The approach is also particularly useful if several actions can remediate the problem.

Figure 5:
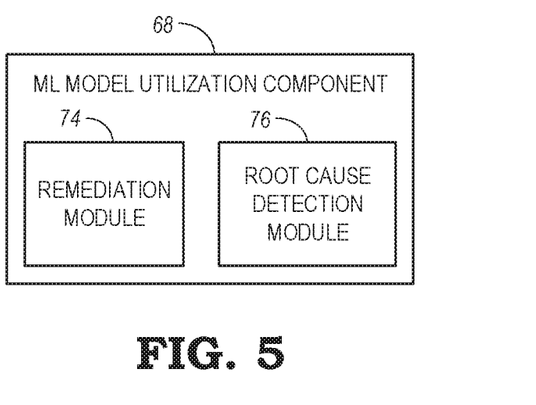
FIG. 5 is a block diagram illustrating the ML model utilization component shown in the ARE of the closed-loop system of FIG. 3, according to various embodiments.

FIG. 5 is a block diagram illustrating an embodiment of the ML model utilization component 68 shown in the ARE 56 of the closed-loop system 50 of FIG. 3. In this embodiment, the ML model utilization component 68 includes a remediation module 74 and a root cause detection module 76. The ARE 56 may be equipped with an Action Classifier $C_A(S^x, S^y)=A^{xy}$ as described below with respect to FIG. 6. The ARE 56 can use the ML model to solve at least a couple network problems at once:
1) If a network element is in a problematic state $S^p\_i$, the ARE can suggest a remediation action to get back to normal state $S''\_j$;
2) Conversely, if a problem occurs (i.e., a transition from normal to problematic states, $S''\_i \rightarrow S^p\_j$), the ARE can suggest what action (if any) is the likely root-cause for the problem.

The remediation module 74 may be configured to suggest remediation actions in a closed-loop application. For example, by monitoring the states of each network element at regular time intervals (e.g., using the state classifier $C_S$ described below with respect to FIG. 6), the remediation module 74 can use the ARE every time a problematic state $S^p$ is detected. More specifically, the remediation module 74 can ask what action(s) should be executed to get back to normal state $S''$, which may be defined as follows:

$$C_A(S^p, S'') = \{A^{pn}, P(A^{pn})\}$$

It should be noted that $A^{pn}$ is not necessarily unique. There can be several possibilities, each with a probability $P(A^{pn})$.

At least two aspects may be considered in concrete implementations:

If none of the possible actions have high enough probability $P(A)$, the remediation module 74 of the ARE 56 may give a response to essentially say: "I don't know," "No remediation actions are recommended," or some other suitable indication (instead of automatically reporting the action with the largest probability).

If more than one actions have high enough probability $P(A)$, the remediation module 74 of the ARE 56 may use further rules (e.g., business rules) to decide which A is the best. In some cases, the action with the highest probability may be recommended. However, if multiple actions have a high probability (e.g., exceeding a threshold), then a selection process based on the additional rules may be used (instead of automatically reporting the action with largest probability).

The procedure of suggesting one or more remediation actions may include determining a probability parameter associated with each of the one or more remediation actions and comparing each probability parameter with a predetermined threshold level. Then, the procedure may include providing an output recommending that no remediation action be imposed on the network in response to determining that the probability parameter associated with each remediation action is below the predetermined threshold level. Responsive to determining that one or more probability parameters exceed the predetermined threshold level, the procedure includes providing an output recommending that one or more selected remediation actions be imposed on the network based on a predefined rule. The one or more selected remediation actions may be selected from the one or more remediation actions having a probability parameter that exceeds the predetermined threshold level.

The procedure of identifying the one or more root causes may include determining a probability parameter associated with each of the one or more root causes and comparing each probability parameter with a predetermined threshold level. The procedure may also include providing an output indicating that no root cause is likely in response to determining that the probability parameter associated with each root cause is below the predetermined threshold level. Responsive to determining that one or more probability parameters exceed the predetermined threshold level, the procedure may include providing an output, based on a predefined rule, that one or more root causes are likely.

Generally speaking, the remediation module 74 of the ARE 56 can learn about any action that has a visible impact on the states of the network elements and happened frequently enough in its training dataset. The following are a non-exhaustive list of examples of remediation actions that may be performed on the network 52: a) route traffic through an alternate path, if available, b) changing a QoS policy on a port to drop other traffic and prioritize other traffic (e.g., video traffic), c) migrating payload closer to a source, or other suitable actions.

The root cause detection module 76 of the ML model utilization component 68 may be run in the ARE 56 to identify one or more possible root-causes of issues in the network 52. For example, some root causes may be related to configuration changes in the network 52. Similar to the remediation module 74, the root cause detection module 76 can also use the ARE 56 to help identify the root-cause when a network element transitions from a normal state to a problematic state: $S^n \rightarrow S^p$. This may be defined by:

$$C_A(S^n, S^p) = \{A^{np}, P(A^{np})\}$$

$P(A^{np})$ is the probability that a given action could have caused the problem observed. Other techniques (not specifically described herein) may be used to catch certain issues (e.g., issues originating from equipment aging). The techniques described in the present disclosure, however, may be very effective with catch other types of issues (e.g., issues originating from configuration changes in the network).

Two aspects can be considered in a concrete implementation of the root cause detection module 76:

- If none of the possible actions have high enough probability P(A), the root cause detection module 76 of the ARE 56 may essentially say: "I don't know," "No root causes detected," or some other suitable indication (instead of automatically reporting the action with largest probability).
- If several actions have a high enough probability P(A), the root cause detection module 76 of the ARE 56 may report all possible root-causes and let the network operator finalize an investigation to ultimately determine the cause or causes (instead of automatically reporting the action with largest probability).

Figure 6:
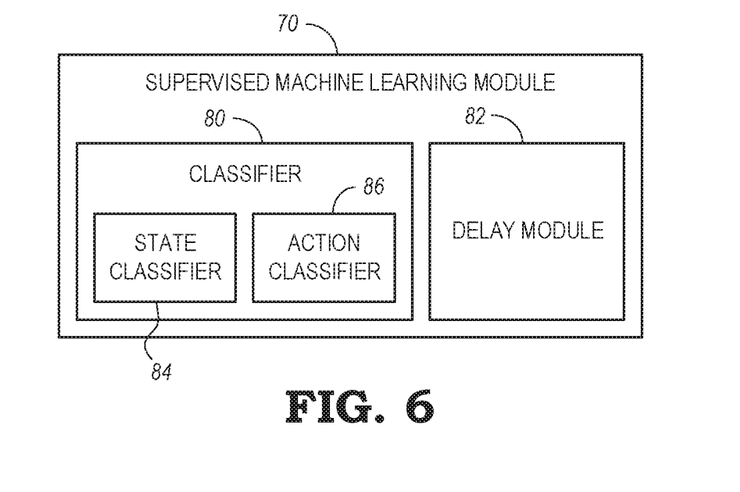
FIG. 6 is a block diagram illustrating the supervised ML module shown in the ML component of FIG. 4, according to various embodiments.

FIG. 6 is a block diagram illustrating an embodiment of the supervised ML module 70 shown in the ML component 64 of FIG. 4. In this embodiment, the supervised ML module 70 includes a classifier 80 and a delay module 82. The classifier 80 includes a state classifier 84 and an action classifier 86.

The delay module 82 may be configured to determine an i→j offset. Input KPI and Alarm time-series data may be obtained by the monitoring system 54 at a certain frequency (e.g., every second, every 15 minutes, etc.), but the delay $d_{ij}$ between the time i when Action A_i is executed and the time j when it has a visible effect on the state S_j can vary and is not known a priori.

One solution is to handle $d_{ij}$ as a hyper-parameter of the ML model. Then, the delay module 82 can determine an optimal value of $d_{ij}$ with usual hyper-parameter tuning machinery. In one embodiment, this may include trying different $d_{ij}$ values, re-training, re-testing $C_A$ each time, and selecting the one that gives the best results.

Another approach is to feed all i→j inputs to a larger classifier algorithm:

$$C_A(KPI\_i, Alarms\_i, KPI\_i+1, Alarms\_i+1, \ldots, KPI\_j, Alarms\_j) = A^{xy}$$

Then, the next step may be to use $C_A(S^x\_i, S^y\_j)$ inside the ARE 56, as described with respect to the ARE 56 shown in FIG. 3.

Figure 7:
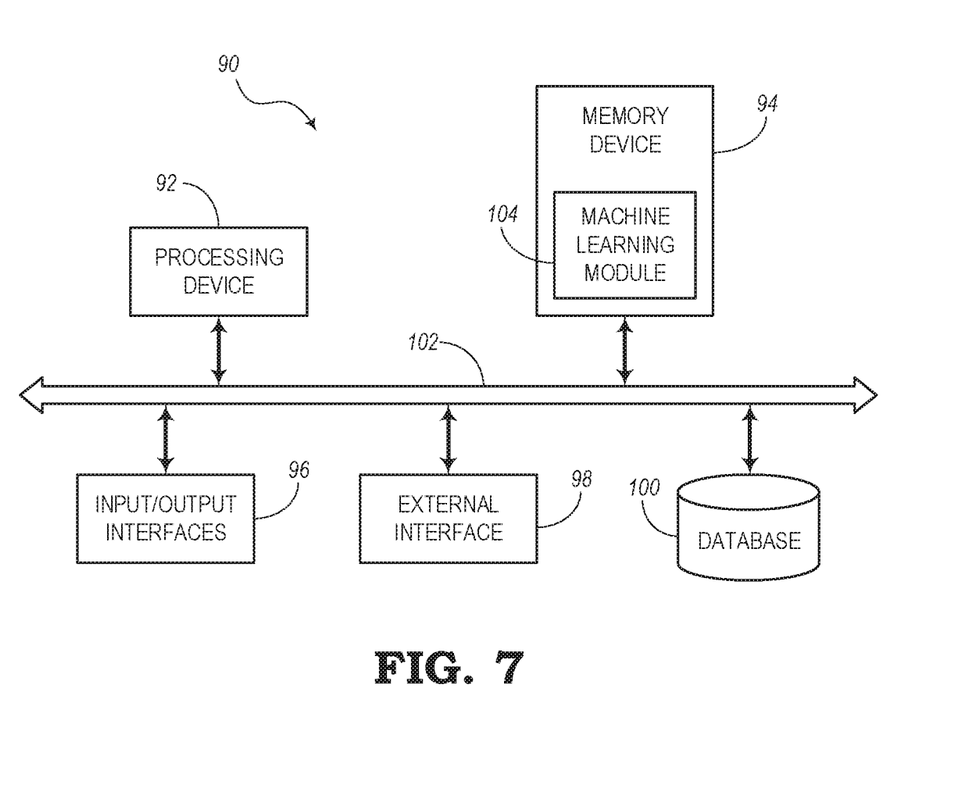
FIG. 7 is a block diagram illustrating another ARE, according to various embodiments.

FIG. 7 is a block diagram illustrating another embodiment of an Action Recommendation Engine (ARE) 90, which may be used for providing closed-loop or feedback control to a network (or other executable system or environment). In the illustrated embodiment, the ARE 90 may be a digital computer that, in terms of hardware architecture, generally includes a processing device 92, a memory device 94, Input/Output (I/O) interfaces 96, an external interface 98, and a database 100. The memory device 94 may include a data store, database (e.g., database 100), or the like. It should be appreciated by those of ordinary skill in the art that FIG. 7 depicts the ARE 90 in a simplified manner, where practical embodiments may include additional components and suitably configured processing logic to support known or conventional operating features that are not described in detail herein. The components (i.e., 92, 94, 96, 98, 100) are communicatively coupled via a local interface 102. The local interface 102 may be, for example, but not limited to, one or more buses or other wired or wireless connections. The local interface 102 may have additional elements, which are omitted for simplicity, such as controllers, buffers, caches, drivers, repeaters, receivers, among other elements, to enable communications. Further, the local interface 102 may include address, control, and/or data connections to enable appropriate communications among the components 92, 94, 96, 98, 100.

The processing device 92 is a hardware device adapted for at least executing software instructions. The processing device 92 may be any custom made or commercially available processor, a Central Processing Unit (CPU), an auxiliary processor among several processors associated with the ARE 90, a semiconductor-based microprocessor (in the form of a microchip or chip set), or generally any device for executing software instructions. When the ARE 90 is in operation, the processing device 92 may be configured to execute software stored within the memory device 94, to communicate data to and from the memory device 94, and to generally control operations of the ARE 90 pursuant to the software instructions.

It will be appreciated that some embodiments of the processing device 92 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 92 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 96 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 96 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The external interface 98 may be used to enable the ARE 90 to communicate over a network, such as the network 32, 52, the Internet, a Wide Area Network (WAN), a Local Area Network (LAN), and the like. The external interface 98 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The external interface 98 may include address, control, and/or data connections to enable appropriate communications on the network 32, 52.

The memory device 94 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 94 may incorporate electronic, magnetic, optical, and/or other types of storage media. The memory device 94 may have a distributed architecture, where various components are situated remotely from one another, but can be accessed by the processing device 92. The software in memory device 94 may include one or more software programs, each of which may include an ordered listing of executable instructions for implementing logical functions. The software in the memory device 94 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 94 may include a data store used to store data. In one example, the data store may be located internal to the ARE 90 and may include, for example, an internal hard drive connected to the local interface 102 in the ARE 90. Additionally, in another embodiment, the data store may be located external to the ARE 90 and may include, for example, an external hard drive connected to the Input/Output (I/O) interfaces 96 (e.g., SCSI or USB connection). In a further embodiment, the data store may be connected to the ARE 90 through a network and may include, for example, a network attached file server.

Moreover, some embodiments may include a non-transitory computer-readable storage medium having computer readable code stored in the memory device 94 for programming the ARE 90 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 92 that, in response to such execution, cause the processing device 92 to perform a set of operations, steps, methods, processes, algorithms, functions, techniques, etc. as described herein for the various embodiments.

Therefore, according to various embodiments of the present disclosure, the ARE 90 may be configured in a closed-loop system. The ARE 90 comprises the processing device 92 and the memory device 94 configured to store a computer program having logic instructions (e.g., ML module) configured to cause the processing device to execute certain functions. For example, the logic instructions are configured to obtain input data pertaining to a state of a system (or environment 12, network 32, 52, etc.) in the closed-loop system and obtain information regarding one or more historical actions performed on the system. Furthermore, the logic instructions are configured to utilize a ML model for imposing one or more current actions on the system. The one or more current actions selected from the group of procedures consisting of: a) suggesting one or more remediation actions that, when performed, transition the system from a problematic state to a normal state, and b) identifying one or more root causes in response to detecting a transition in the system from a normal state to a problematic state.

Furthermore, the ARE 90 may be configured such that the logic instructions cause the processing device to train the ML model. Training the ML model may use one or more processes selected from the group of processes consisting of: a) implementing a supervised ML technique, and b) implementing a collaborative filtering technique. The supervised ML technique may include a classification process for classifying the state of the system and classifying the one or more historical actions performed on the system. The collaborative filtering technique may include the processes of: a) collecting action information regarding the one or more historical actions executed by a plurality of components of the system, b) comparing the action information associated with the plurality of components, and c) ranking and recommending the one or more remediation actions based on comparing the action information.

The input data may be time-series data captured from the network by one of a Network Management System (NMS) and a Network Configuration and Change Management (NCCM) device. The input data may include one or more of alarms, Key Performance Indicators (KPIs), network traffic information, service flow information, Quality of Service (QoS) information, and Quality of Experience (QoE) information. The one or more historical actions may include one or more of a channel addition process, a channel deletion process, a software upgrade, and a protection switch process. The procedure of suggesting one or more remediation actions may include one or more of: a) recommending a plan for re-routing network traffic through an alternative path in the network, b) recommending a change to a Quality of Service (QoS) policy on a port in the network to prioritize network traffic, and c) recommending to migrate a payload closer to a source in the network.

Further regarding the ARE 90, the procedure of suggesting one or more remediation actions may include: a) determining a probability parameter associated with each of the one or more remediation actions, b) comparing each probability parameter with a predetermined threshold level, c) providing an output recommending that no action be imposed on the system in response to determining that the probability associated with each remediation action is below the predetermined threshold level, and d) responsive to determining that multiple probabilities exceed the predetermined threshold level, providing an output recommending a selected action of the one or more remediation actions be imposed on the system based on a predefined rule.

Similarly, the action of identifying the one or more root causes may include: a) determining a probability parameter associated with each of the one or more root causes, b) comparing each probability parameter with a predetermined threshold level, c) providing an output indicating that no root cause is likely in response to determining that the probability associated with each root cause is below the predetermined threshold level, and d) responsive to determining that multiple probabilities exceed the predetermined threshold level, providing an output that multiple root causes are likely based on a predefined rule.

Figure 8A:
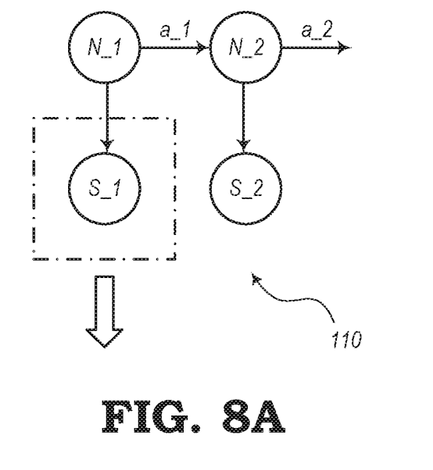
FIG. 8A is a diagram illustrating a first classifier for classifying a state of a network, according to various embodiments.

FIG. 8A is a diagram showing an embodiment of a first classifier, i.e., a state classifier 110, of the ARE 56 for classifying a state of a network (e.g., network 52). The state classifier 110 may be configured to learn, based on historical data, what action $A^{xy}\_i$ executed at time i can change the state of a network element from $S^x\_i$ (at time i) to $S^y\_j$ (at later time j). If the states $S^x$ and $S^y$ are known, a classifier $C_A$ can be defined as:

$$C_A(S^x\_i, S^y\_j) = A^{xy}$$

Figure 8B:
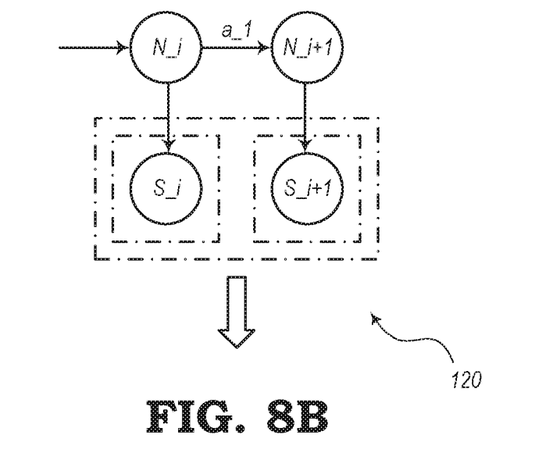
FIG. 8B is a diagram illustrating a second classifier for classifying an action of a network, according to various embodiments.

FIG. 8B is a diagram showing an embodiment of a second classifier for classifying an action of a network (e.g., network 52). In most cases, however, the state is not known directly. To address this, a second classifier $C_S$(KPI_i, Alarms_i) can be trained to learn, based on historical data, what is the most probable state of a network element given its KPIs and Alarms at a given time. In this case:

$$C_S(KPI\_i, Alarms\_i) = S^x\_i$$

$$C_S(KPI\_j, Alarms\_j) = S^y\_j$$

$$C_A(S^x\_i, S^y\_j) = A^{xy}$$

If preferred, it is also possible to skip the States and learn about the Actions directly from the input KPIs and Alarms:

$$C_A(KPI\_i, Alarms\_i, KPI\_j, Alarms\_j) = A^{xy}$$

Figure 9:
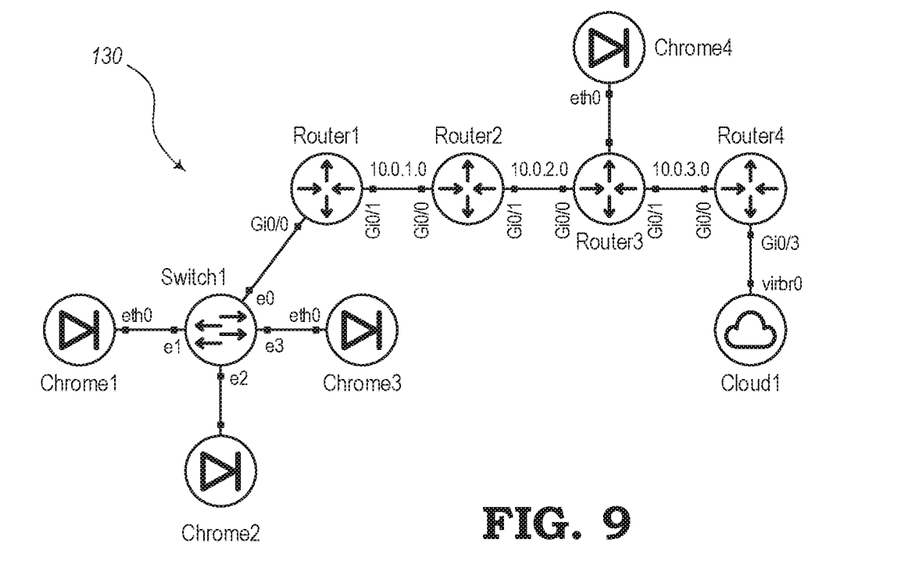
FIG. 9 is a diagram illustrating an architecture of a network having a state classifier and action classifier with supervised ML, according to various embodiments.

FIG. 9 is a diagram illustrating an embodiment of an architecture 130 of a network having a state classifier and action classifier with supervised ML. The architecture 130 may be a working prototype implementation or Proof of Concept of a state classifier ($C_S$) and action classifier ($C_A$) implemented with supervised ML (e.g., supervised ML module 70). The architecture 130 may be associated with the following example pseudo-code:

```
state_dataset=multiswitch_dataset
#State at a given time – Training
state_classifier = sklearn.ensemble.GradientBoostingClassifier( )
state_classifier.fit(state_dataset_features, state_dataset_labels)
#Action to transition from state_i to state_j
t=1
nTot=len(state_dataset)
action_dataset = [ ]
action_labels = [ ]
while t<nTot:
    probabilities_of_states_i =
state_classifier.predict_proba( state_dataset_features[t-1] )
    probabilities_of_states_j =
state_classifier.predict_proba( state_dataset_features[t] )
#Note: probabilities_of_states have length 3, i.e.: [P(S1), P(S2), P(S3)]
action_dataset.append( [probabilities_of_states_i,
probabilities_of_states_j] )
action_labels=actions[t-1] #e.g. no_action_taken, introduce_clients,
etc.
t+=1
action_classifier = sklearn.ensemble.GradientBoostingClassifier( )
action_classifier.fit(action_dataset, action_labels)
suggested_action = action_classifier.predict( [current_state, target_state]
```

Figure 10:
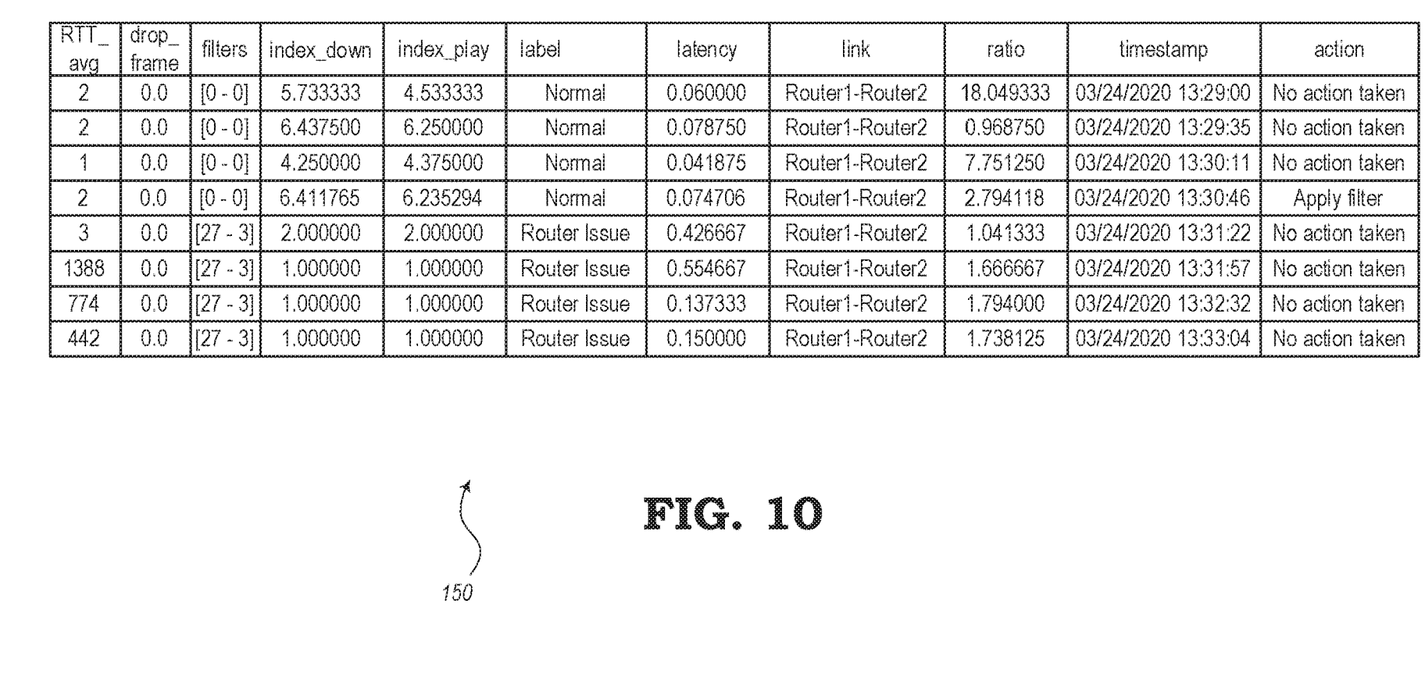
FIG. 10 is a table illustrating a sample of input data obtained from a network and actions taken on the network, according to one example.

FIG. 10 is a table 150 showing an example of sample input data obtained from a network and actions taken on the network. The input data may include the dataset:

KPIs and states=5533 row×26 columns

Actions≈1100

Regarding data aggregation strategies, an example of KPI data with associated Actions from in one test is shown in the table 150. It may be necessary to transform the raw inputs before they can be consumed by the ARE 56. For example, looking at "action" vs "RTT_avg" values, it may be seen that there is a delay between the "Apply filter" action and its impact on the "RTT_avg" state. A possible solution may be a delay of aggregate data from multiple time bins before going to the ARE 56. In this case, it may be necessary to define aggregation rules for each column. Numerical KPIs may naturally get handled with simpler average/min/max functions, but Actions may need special rules. In this example, practical aggregations rule for Actions may include: "rarer action wins," "No action taken loses," or other suitable rules.

Figure 11:
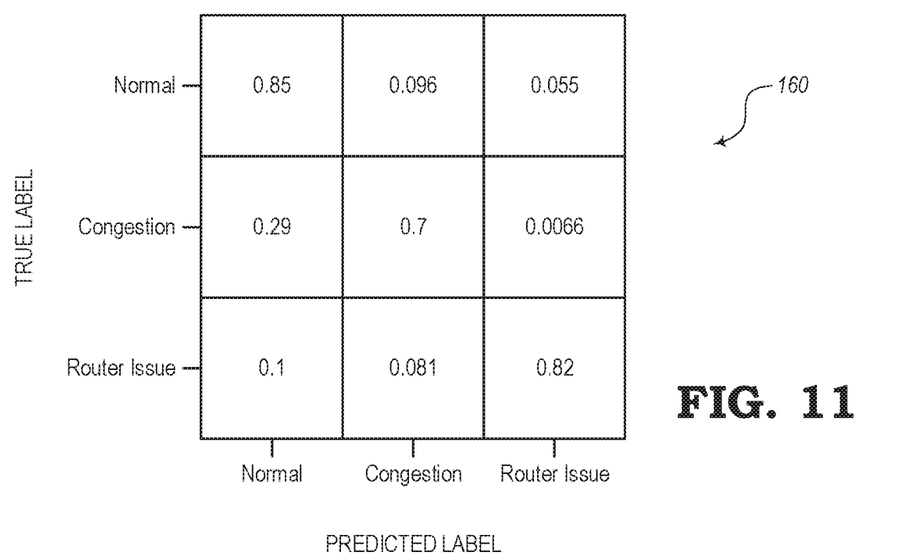
FIG. 11 is a normalized confusion matrix illustrating sample results of a state classifier, according to one example.
Figure 12:
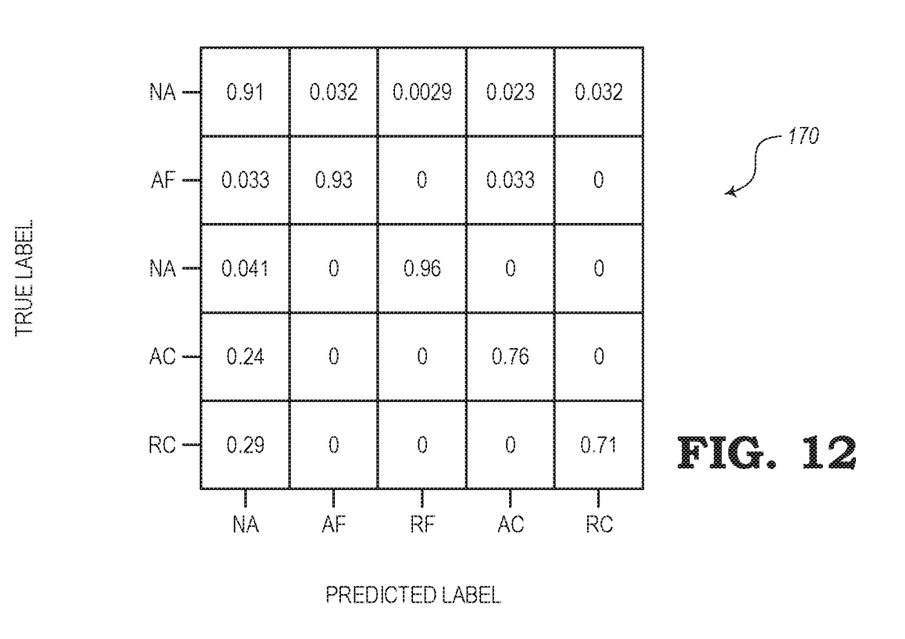
FIG. 12 is a normalized confusion matrix illustrating sample results of an action classifier, according to one example.

FIG. 11 is a normalized confusion matrix 160 illustrating sample preliminary results of a state classifier. FIG. 12 is another normalized confusion matrix 170 illustrating sample preliminary results of an action classifier. As shown in FIG. 12, the actions considered in this embodiment may be defined as follows:

NA=No Action

AF=Apply Filter (create router issue)

RF=Remove Filter (fix router issue)

AC=Add Video Clients (create traffic congestion)

RC=Remove Video Clients (fix traffic congestion)

When tested, the action classifier ($C_A$) 86 was able to identify root-cause and remediation actions with good precision for router issues, and with medium precision for traffic congestion. The explanation for lesser precision with traffic congestion is the longer delay $d_{ij}$ in this case.

The AI-based feedback loop systems, closed-loop systems, and AREs described in the present disclosure provide some benefits over conventional systems. Instead of a purely "recommendation" engine that recommends products, movies, songs, etc., the ARE is configured to recommend "actions" to be performed in a system or environment. In particular, the ARE systems described herein may be incorporated in a management or supervisory platform of a network for monitoring parameters of the network elements and activities related to network elements, training a ML model to learn what types of actions should be imposed on the network, utilizing the ML model to optimize the operations of the network elements based on certain criteria.

The implementations of the ARE systems described herein may be include (multi-class) classifiers trained with a supervised ML approach, where the time-series of Alarms and KPIs are the features characterizing the different possible states of network elements, while the Actions are the labels that can be learned. The Actions, KPI, and Alarms data can be collected from various sources, such as a NMS, NCCM, etc. Collection may also include the accumulation of big historical data sets.

Once collected, the data can be properly formatted to allow it to be consumable by the ML trainer. Specific methods are described herein to learn delay ($d_{ij}$) between the time an action is executed and the time it takes effect from historical network data. The delay ($d_{ij}$) can be handled in many different ways. For example, the delays can be handled as:
a) hyper-parameters of the ML model,
b) aggregate inputs in time bins of duration $d_{ij}$, or
c) rules to aggregate actions (e.g., "rarer wins," "do-nothing loses," etc.).
In some cases, the delays can be fed as i→j inputs to a classifier algorithm.

According to various implementations, the ARE may use CF, supervised ML, or a combination so CF and supervised ML. In some implements, the ARE may use supervised ML first to recommend actions, and then the ARE could use a CF approach to fine-tune the recommendations of the supervised ML without retraining.

Also, the ARE may be utilized in a novel way, such as:
1) given a problematic network element, recommend action $A^{pn}$ that will go back to normal state, or
2) given a problematic network element, suggest what action $A^{np}$ (if any) is the likely root-cause for a normal→problematic transition.

This may involve computing a probability P(A) of each possible action and defining a minimum probability threshold for an action to be worth recommending. In some embodiments, if several actions are above the threshold, the present systems may use business logic (e.g., cost of remediation) to choose best action or use CF to improve relevance and ranking of remediation actions. If no action has a high probability, a return of "no action found" may be provided.

The probability threshold may use a "soft max" or other changeable threshold value for comparison. If no samples meet the threshold, the algorithm of the ARE can say, "I don't know." For example, the algorithm may determine that there are ten possible root causes that have been observed in the network. To remediate the issues, the ARE can go with the action with the highest probability. However, in a network environment, a network element (e.g., a network card) could show signs of failure due to aging or there may a fiber cut due to construction on a road where the fiber optic cable is laid. In this case, there may not be any network configuration actions that a network operator can take to solve the issue.

If the probabilities of the action are all determined to be lower than the threshold, then the ARE can respond with "I don't know the root cause." Alternatively, if more than one probability is higher than the threshold, the ARE could return a) just the highest, b) all the ones that exceed the threshold, or c) use business logic that has other rules to statistically decide a tie-breaker.

According to some embodiments, it may be possible to collect data in the closed loop to determine that something is about to go wrong in the environment (e.g., a network card is about to fail). In this case, the ARE may recommend that data traffic is re-routed around the "defective" card or perform some other action in the network. This might include re-routing traffic or provisioning new bandwidth somewhere in the network to automatically execute some actions.

The ARE can suggest taking certain recommended actions. This could be fully automated where the suggestion gets implemented without human intervention. In some embodiments, the recommendation may use a semi-automatic policy that automatically takes certain actions, but also may make some recommendation to allow a network operator or other management or supervisor to decide whether or not to proceed with the recommendation.

Supervised ML involves looking at the actions that have been taken in the past and observing what effect they have had on the environment. The ARE can observe the state of network elements and determine when there is a state change (e.g., from state X to state Y). Actions can be taken to cause another state transition. When the ARE is trained to learn what actions cause what state transitions, then the ML model can be used in the ARE. For instance, the state classifier can map actions to states using the confusion matrices shown in FIGS. 11 and 12. However, in the present disclosure, the ARE can go a step further by associating the mappings with a probability.

In some cases, the remediation may not necessarily be the reverse of the action that caused it. For example, it might be re-routing traffic, but the root-cause might be not necessarily the reverse.

ML may be based on statistical analysis. The input may be received the same way as conventional ML, but, according to some implementations of the present disclosure, there may be limited or no ML training in the ARE. The training may be performed on the fly with any historical data available. Supervised learning may be run at the beginning (e.g., when a network is established), but it can be retrained any number of times thereafter to replace an old model with a new one.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An Action Recommendation Engine (ARE) comprising a processing device, and
a memory device configured to store a computer program having logic instructions configured to cause the processing device to
obtain input data that is time-series data pertaining to a state of a network,
obtain information regarding one or more historical actions performed on the network, and
utilize a Machine Learning (ML) model for imposing one or more current actions on the network using a delay that accounts for when the one or more current actions are executed until the one or more current actions produce an effect on the state of the network, the one or more current actions selected from the group of procedures consisting of
suggesting one or more remediation actions that, when performed, transition the network from a problematic state to a normal state, and
identifying one or more root causes in response to detecting a transition in the network from a normal state to a problematic state.

2. The ARE of claim 1, wherein the logic instructions are further configured to cause the processing device to train the ML model.

3. The ARE of claim 2, wherein training the ML model uses one or more processes selected from the group of processes consisting of
implementing a supervised ML technique, and
implementing a collaborative filtering technique.

4. The ARE of claim 3, wherein the supervised ML technique includes a classification process for classifying the state of the network and classifying the one or more historical actions performed on the network.

5. The ARE of claim 3, wherein the collaborative filtering technique comprises the processes of
collecting action information regarding the one or more historical actions executed by a plurality of components of the network,
comparing the action information associated with the plurality of components, and
ranking and recommending the one or more remediation actions based on comparing the action information.

6. The ARE of claim 1, wherein the input data is captured from the network by one of a Network Management System (NMS) and a Network Configuration and Change Management (NCCM) device.

7. The ARE of claim 6, wherein the input data includes one or more of alarms, Key Performance Indicators (KPIs), network traffic information, service flow information, Quality of Service (QoS) information, and Quality of Experience (QoE) information.

8. The ARE of claim 7, wherein the one or more historical actions include one or more of a channel addition process, a channel deletion process, a software upgrade, and a protection switch process.

9. The ARE of claim 1, wherein the procedure of suggesting one or more remediation actions includes one or more of
recommending a plan for re-routing network traffic through an alternative path in the network,
recommending a change to a Quality of Service (QoS) policy on a port in the network to prioritize network traffic, and
recommending migrating a payload closer to a source in the network.

10. The ARE of claim 1, wherein the procedure of suggesting one or more remediation actions includes
determining a probability parameter associated with each of the one or more remediation actions,
comparing each probability parameter with a predetermined threshold level,
providing an output recommending that no remediation action be imposed on the network in response to determining that the probability parameter associated with each remediation action is below the predetermined threshold level, and
responsive to determining that one or more probability parameters exceed the predetermined threshold level, providing an output recommending that one or more selected remediation actions be imposed on the network based on a predefined rule, the one or more selected remediation actions being selected from the one or more remediation actions having a probability parameter that exceeds the predetermined threshold level.

11. The ARE of claim 1, wherein the procedure of identifying the one or more root causes includes
determining a probability parameter associated with each of the one or more root causes,
comparing each probability parameter with a predetermined threshold level,
providing an output indicating that no root cause is likely in response to determining that the probability parameter associated with each root cause is below the predetermined threshold level, and
responsive to determining that one or more probability parameters exceed the predetermined threshold level, providing an output, based on a predefined rule, that one or more root causes are likely.

12. A non-transitory computer-readable medium configured to store computer logic having instructions that, when executed, cause one or more processing devices to
obtain input data that is time-series data pertaining to a state of a network,
obtain information regarding one or more historical actions performed on the network, and
utilize a Machine Learning (ML) model for imposing one or more current actions on the network using a delay that accounts for when the one or more current actions are executed until the one or more current actions produce an effect on the state of the network, the one or more current actions selected from the group of procedures consisting of
suggesting one or more remediation actions that, when performed, transition the network from a problematic state to a normal state, and
identifying one or more root causes in response to detecting a transition in the network from a normal state to a problematic state.

13. The non-transitory computer-readable medium of claim 12, wherein the instructions, when executed, further cause the one or more processing devices to train the ML model using one or more processes selected from the group of processes consisting of
implementing a supervised ML technique, and
implementing a collaborative filtering technique.

14. The non-transitory computer-readable medium of claim 13, wherein the supervised ML technique includes a classification process for classifying the state of the network and classifying the one or more historical actions performed on the network.

15. The non-transitory computer-readable medium of claim 13, wherein the collaborative filtering technique comprises the processes of
collecting action information regarding the one or more historical actions executed by a plurality of components of the network,
comparing the action information associated with the plurality of components, and
ranking and recommending the one or more remediation actions based on comparing the action information.

16. A method comprising the steps of
obtaining input data that is time-series data pertaining to a state of a network,
obtaining information regarding one or more historical actions performed on the network, and
utilizing a Machine Learning (ML) model for imposing one or more current actions on the network using a delay that accounts for when the one or more current actions are executed until the one or more current actions produce an effect on the state of the network, the one or more current actions selected from the group of procedures consisting of
suggesting one or more remediation actions that, when performed, transition the network from a problematic state to a normal state, and identifying one or more root causes in response to detecting a transition in the network from a normal state to a problematic state.

17. The method of claim 16, wherein the input data is captured from the network by one of a Network Management System (NMS) and a Network Configuration and Change Management (NCCM) device.

18. The method of claim 17, wherein the input data includes one or more of alarms, Key Performance Indicators (KPIs), network traffic information, service flow information, Quality of Service (QoS) information, and Quality of Experience (QoE) information, and wherein the one or more historical actions include one or more of a channel addition process, a channel deletion process, a software upgrade, and a protection switch process.

19. The method of claim 17, wherein the procedure of suggesting one or more remediation actions includes one or more of
    recommending a plan for re-routing network traffic through an alternative path in the network,
    recommending a change to a Quality of Service (QoS) policy on a port in the network to prioritize network traffic, and
    recommending migrating a payload closer to a source in the network.

20. The method of claim 16, wherein
the procedure of suggesting one or more remediation actions includes
    determining a probability parameter associated with each of the one or more remediation actions,
    comparing each probability parameter with a predetermined threshold level,
    providing an output recommending that no remediation action be imposed on the network in response to determining that the probability parameter associated with each remediation action is below the predetermined threshold level, and
    responsive to determining that one or more probability parameters exceed the predetermined threshold level, providing an output recommending that one or more selected remediation actions be imposed on the network based on a predefined rule, the one or more selected remediation actions being selected from the one or more remediation actions having a probability parameter that exceeds the predetermined threshold level, and
wherein the procedure of identifying the one or more root causes includes
    determining a probability parameter associated with each of the one or more root causes,
    comparing each probability parameter with a predetermined threshold level,
    providing an output indicating that no root cause is likely in response to determining that the probability parameter associated with each root cause is below the predetermined threshold level, and
    responsive to determining that one or more probability parameters exceed the predetermined threshold level, providing an output, based on a predefined rule, that one or more root causes are likely.

* * * * *